United States Patent Office 3,399,262
Patented Aug. 27, 1968

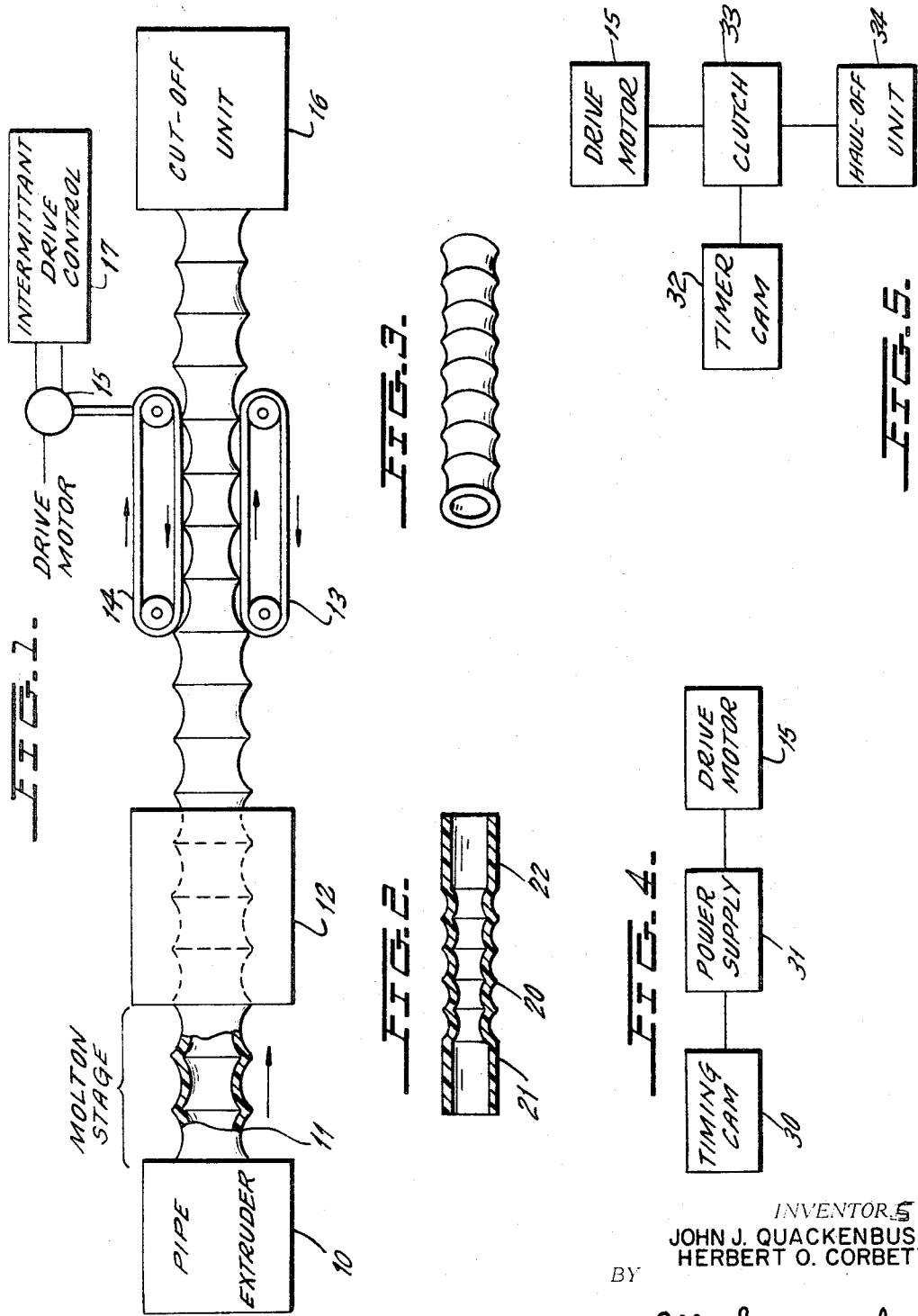

3,399,262
EXTRUDED THERMOPLASTIC FLEXIBLE PIPE AND HOSE
John J. Quackenbush, Monroe, and Herbert O. Corbett, Bridgeport, Conn., assignors to National Distillers and Chemical Corporation, a corporation of Virginia
Filed Sept. 26, 1966, Ser. No. 581,835
5 Claims. (Cl. 264—209)

ABSTRACT OF THE DISCLOSURE

Apparatus for the continuous extrusion of corrugated pipe or hose from thermoplastic materials. By intermittently varying the speed at which the fluid plastic pipe or tube is drawn away from the extruder outlet, the diameter of the tube will neck down or decrease at each instance in the haul-off rate and the tube diameter will increase or return to approximately extruder outlet diameter at each decrease of the haul-off rate, thereby producing a corrugated tube through a continuous extrusion process, the number, spacing and extent of each corrugation (portion of reduced diameter) having direct relationship to each increase in the haul-off rate and the duration thereof.

This invention relates to a novel process and apparatus for the continuous extrusion of corrugated pipe or hose of thermoplastic material, and more specifically relates to a novel modification for pipe extrusion apparatus for converting apparatus to the production of a corrugated pipe.

Apparatus for the continuous extrusion of pipe of thermoplastic material is well known. Thus, a standard extruder continuously extrudes a tube of molten thermoplastic material into a suitable cooling region which "sets" the tube. A "haul-off" unit continually moves the pipe through the cooling region and away from the extruder outlet. The pipe passing through the hauling-off unit is then coiled or cut to length in subsequent material handling stages.

In accordance with the invention, the standard haul-off unit in the well-known process above is modified to intermittently change speed, whereby at higher speeds the fluid plastic tube leaving the extruder outlet will neck down to a smaller diameter, while at low speed the diameter of the tube leaving the extruder will be larger than during the high speed haul-off. This intermittent haul-off rate will then cause the appearance of corrugations in the thermoplastic tube leaving the extruder with the corrugated configuration being set or hardened in the cooling stage.

Any suitable means may be used for timing the haul-off unit to produce this selective narrowing and enlarging of the diameter and any corrugation sequence for the tube can be formed. For example the corrugated regions can blend into an elongated single diameter region which could serve as a flexible hose ending of the usual type. Moreover, any desired type of thermoplastic material can be used in accordance with the invention, depending upon the application to which the flexible hose is to be put. In addition, laminated types of structures could be used where the pipe is made of any desired number of plies of diverse materials in the manner disclosed in copending application Ser. No. 350,220, filed Mar. 9, 1964, entitled "Laminated Products and Methods and Apparatus for Producing Same," in the name of Herbert O. Corbett, and assigned to the assignee of the present invention.

Accordingly, a primary object of this invention is to provide a novel method for the production of thermoplastic flexible tubing.

Yet another object of this invention is to provide a novel method and apparatus for the formation of a corrugated tube which is universally flexible.

A still further object of this invention is to perform a relatively minor modification of the presently existing plastic pipe extruding equipment to form a highly flexible corrugated tubular product.

A still further object of this invention is to controllably modify the haul-off speed of pipe extruding equipment in order to form a corrugated pipe.

These and other objects of this invention will become apparent from the following description when taken in connection with the drawings, in which:

FIGURE 1 schematically illustrates a line diagram of a well-known pipe extruding apparatus which is modified with the intermittent drive control in accordance with the invention for the production of corrugated tubing.

FIGURE 2 illustrates one type of product that could be manufactured in accordance with the invention.

FIGURE 3 illustrates a second type product which could be manufactured in accordance with the invention.

FIGURE 4 is a block diagram schematically illustrating one type of intermittent drive control that could be used in FIGURE 1.

FIGURE 5 illustrates a second embodiment of an intermittent drive control that could be used in the embodiment of FIGURE 1.

Referring now to FIGURE 1, there is illustrated therein a standard type of plastic pipe extruder 10 which is adapted to extrude a continuous tube of thermoplastic material of any desired composition and any desired layer configuration. A plastic tube 11 issues from the extruder 10 and is in a deformable state until reaching a suitable chilling tank 12 which operates to set or freeze the tube 11. Chilling tank 12 is commonly a water bath or the like. The frozen tube 11 then issues from chilling tank 12, into a "haul-off" unit which is comprised of opposing endless conveyors 13 and 14, which are driven by a suitable drive motor 15. Note that the haul-off belts 13 and 14 tightly grip the opposing ends of tube 13 and mechanically draw the tube through the chilling tank 12, and out of the extruder 11. Moreover, the diameter of tube 11 issuing from extruder 10 will depend at least in part on haul-off speed since the tube issuing from the extruder will neck down at higher speeds and tend to assume the diameter of the discharge orifice of extruder 10 at lower speeds. The pipe 11 is thereafter moved into a suitable cut-off unit 16 which cuts the tube to length in the well-known manner.

In accordance with the present invention, the drive motor 15 and thus haul-off belts 13 and 14 are intermittently driven between a first and second draw-off speed by virtue of the intermittent drive control system 17 connected to drive motor 15. It will be readily understood that this involves a relatively minor modification to presently existing plastic pipe extruding equipment. By intermittently changing the haul-off speed of belts 13 and 14 the speed at which molten plastic leaves extruder 10 will intermittently change the diameter of the tube before it enters the chilling tank 12. Therefore, synchronously changing the intermittent drive speed, a corrugated tube will be formed with the narrower diameter sections corresponding to a higher haul-off speed and the larger diameter sections being formed at the lower haul-off speed.

Pipe formed by merely synchronously changing the haul-off speed will have the configuration similar to that shown in FIGURES 1 and 3 of a simple corrugated cross-section. It is, however, possible to change the haul-off speed of belts 13 and 14 in such a manner as to cause a predetermined number of corrugations, followed by a constant relatively low speed haul-off in order to form a flexible tube of the type shown in FIGURE 2 which has a central corrugated portion 20 terminated by cylindrical uncorrugated end portions 21 and 22.

The precise structure of the intermittent drive control system 17 could take any desired type which will be immediately apparent to those skilled in the art. For example, the system could be completely electrical in nature where, as shown in FIGURE 4, a suitable timing cam 30 will intermittently connect power supply 31 to the drive motor 15 so as to cause the drive motor 15 to operate at intermittently different speeds in accordance with the timing cam 30. A second arrangement for the intermittent drive control 17 of FIGURE 1 can take the form shown in FIGURE 5 where again a suitable timing cam 32 could operate a clutch 33 interposed between drive motor 15 and the haul-off unit 34. In either case, it will be readily appreciated that the modification of presently existing pipe extruding apparatus will be relatively inexpensive.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. The method of forming a corrugated pipe of thermoplastic material comprising the extrusion of a hollow plastic tube, the hauling-off of said extruded plastic tube at a pre-selected rate to control the exterior diameter thereof, the chilling of said tube in a chilling medium, and the continuous gripping of the chilled tube and movement of said chilled tube away from said extruder, and intermittently increasing the speed of movement of said chilled tube away from said extruder to decrease the tube exterior and alternately returning to the pre-selected rate of movement to restore the desired tube exterior diameter.

2. Apparatus for the formation of corrugated tubing comprising, in combination, a hollow tubular extrusion apparatus for continuously extruding a hollow tube of thermoplastic material, a chilling means adjacent said extrusion apparatus and continuously receiving said hollow tube therethrough; and a haul-off means positioned adjacent said chilling means on the side thereof opposite said extrusion apparatus continuously gripping the chilled tube of thermoplastic material issuing from said chilling means, speed control means connected to said haul-off means for drawing said tube out of said extruder at a given speed, and timed intermittent control means connected to said speed control means for intermittently increasing the haul-off speed of said haul-off means, thereby to intermittently change the haul-off speed of said tube and to controllably decrease the diameter of said tube between said extruder and said chilling means at higher speed haul-off.

3. The device as set forth in claim 2, wherein said haul-off means includes a drive motor connected to an endless conveyor gripping said tube.

4. The device as set forth in claim 3, wherein said speed control means comprises a clutch connected between said motor and said endless conveyor.

5. The device as set forth in claim 4, wherein said timed intermittent control means comprises a timing cam.

References Cited
UNITED STATES PATENTS

| | | | |
|---|---|---|---|
| 2,958,160 | 11/1960 | Cooke et al. | 18—14 XR |
| 3,274,315 | 9/1966 | Kawamura | 18—14 XR |
| 3,296,661 | 1/1967 | De Moustier | 18—14 |

FOREIGN PATENTS

| | | |
|---|---|---|
| 235,493 | 1964 | Netherlands. |

WILLIAM J. STEPHENSON, *Primary Examiner.*